United States Patent
Ryu et al.

[11] Patent Number: 5,869,798
[45] Date of Patent: Feb. 9, 1999

[54] WEAR RESISTANT MATERIALS HAVING EXCELLENT WEAR RESISTANCE AND METHOD OF MANUFACTURING THE MATERIAL

[75] Inventors: Byung Jin Ryu; Seung Ho Yang; Kang Hyung Kim, all of Kyung Nam, Rep. of Korea

[73] Assignee: Samsung Heavy Industries Co., Ltd., Kyung Nam, Rep. of Korea

[21] Appl. No.: 742,424

[22] Filed: Oct. 30, 1996

[30] Foreign Application Priority Data

Oct. 31, 1995 [KR] Rep. of Korea .................. 1995 38598

[51] Int. Cl.$^6$ ..................................................... B23K 9/00
[52] U.S. Cl. ............................................................ 219/76.13
[58] Field of Search ................................ 219/76.13, 76.1, 219/76.12, 76.14; 29/888.061

[56] References Cited

U.S. PATENT DOCUMENTS

| 3,098,150 | 7/1963 | Inoue | 219/76.13 |
| 4,226,697 | 10/1980 | Antonov et al. | 219/76.13 |
| 5,363,821 | 11/1994 | Rao et al. | 29/888.061 |

FOREIGN PATENT DOCUMENTS 876209  8/1961  United Kingdom .

*Primary Examiner*—Clifford C. Shaw
*Attorney, Agent, or Firm*—Kenyon & Kenyon

[57] ABSTRACT

The present invention relates to a wear resistant materials having excellent wear resistance and a method of manufacturing the materials, comprising a process that lugs are formed on surface by electro-sparking welding apparatus having a vibrator, and a process that coats solid lubricant layer having wear resistance on the said lugs (ref. FIG. 3).

5 Claims, 1 Drawing Sheet

WEAR RESISTANT MATERIALS HAVING EXCELLENT WEAR RESISTANCE AND METHOD OF MANUFACTURING THE MATERIAL

BACKGROUND OF THE INVENTION

1. Field of the Invention

The present invention relates to a wear resistant material having excellent wear resistance and a method of manufacturing the material, and more particularly to a wear resistant material and a method of manufacturing the material, which has excellent wear resistance and has multi-layers including a solid lubricant layer that provides lubrication into bearing inside lace or contact moving side of pin/bush joint where it is difficult to re-fill the lubricant or to stop the contact moving side for oiling as in the case of a food machine, ship or plane.

2. Description of the Prior Art

In general, wear resistance material used in the joint part of a machinery has resistance against friction wear under high-load and low-speed because of hardness improved by surface hardening method such as carburization, induction hardening and nitriding. However, lubrication of the material is so poor that its friction coefficient is high when the corresponding friction material is iron, since a hard compound layer on the material is formed on iron substrate by the carburizing layer, the nitriding layer or the induction hardening layer or hardened by the martensite transformation of simple rapid heating-cooling as described in the U.S. Pat. No. 5,217,544.

In one prior art attempt to solve the above problem, lubricating film has been formed by providing lubricant to the contact moving side. If, however, low viscous lubricant oil is used as the lubricant, the film will break readily so that there will be the metal-metal friction. Also a high performing leak-preventing apparatus is needed to keep constant lubrication. Use of a highly viscous grease oil with respect to said problem results in preservation of the oil film and little oil-leaking. But there are some problems, e.g., the lubricant swept away from the surface during contact moving can not be provided again, and which the grease is decomposed by heating from the friction. In order to apply the high viscous lubricant such as grease, a given pressure under which the lubricant can be refilled into the oil crack of the friction substrate is used. On the friction substrate, groove is formed as a passage for active filling of the lubricant.

To maintain the lubricating effect, the lubricant needs to be filled periodically and many filling places are required due to the short term of filling, leading to time consumption. Also, if the filling place is located high or amidst complicated parts, it will be hard to mend or check the machine. Accordingly, the lubrication conditions should be noticed because, otherwise there will be damage caused by scoring and scuffing friction, and then the damage will grow into seams or result in stoppage of the machine.

To prevent the above problem, a method of applying $MoS_2$ and PTFE solid lubricant is disclosed in the U.S. Pat. Nos. 5,271,679, 5,332,422, 5,222,816, 5,207,513, and 5.271,619. These solid lubricant coating leads not only to low friction coefficient, but to the decrease of load supporting capability (pressure resistance) of their surface. In particular, under shearing force by friction, the lubricant layer can be removed readily from the surface, and required lubrication and its function can be lost earlier.

In addition, hard chromium coating as disclosed in the U.S. Pat. No. 5,277,785 leads not only to high hardness and high iron affinity, but to scoring friction wear by being peeled during friction due to the fact that the thickness of the coating layer is 20–30 microns. There are additional coating methods for surface hardening, e.g., plasma spraying of hard materials such as alumina dislosed in the U.S. Pat. No. 5,305,726, high melting and hardness chromate oxide disclosed in the U.S. Pat. No. 5,230,750, tungsten carbide disclosed in the U.S. Pat. No. 5,201,917, boron compound disclosed in the U.S. Pat. Nos. 5,194,304, 5,313,919 and 5,332,422, and titanium nitrate disclosed in the U.S. Pat. No. 5,213,848. These materials, however, have low adhesion to steel substrate, and their physical property such as thermal expansion coefficient differs from all. Also their low bending and impact resistance that of the steel substrate limit their use to wear material for mere sliding action.

SUMMARY OF THE INVENTION

Therefore, it is an object of the invention to provide wear resistant materials having excellent wear resistance which has lugs on substrate and solid lubricant layer on the lugs and methods of manufacturing the materials. Another object of the invention is providing wear resistant material which can be used as a joint part moving in high load and low speed. Yet another object of the invention is providing wear resistant materials have long life cycle and the interval between required successive reapplication of the lubricant is long.

The above objects of the invention are accomplished by providing a method of manufacturing the wear resistant materials comprising a process forming the lugs on the substrate by electro-spark welding using a welding apparatus having a vibrator, and a process forming the solid lubricant layer on the lugs by coating solid lubricant having wear resistance.

It is preferable that the material of the lugs is copper alloy, molybdenum alloy, cobalt alloy, alloy of iron and other metals.

It is also preferable that the solid lubricant is $MoS_2$ or PTFE (poly fluoro ethylene).

Also it is possible that the solid lubricant can be Pb, Sn, Bi, Zn and alloys there of.

The above objects of the invention are also accomplished by providing a wear resistant material comprising a substrate; a lug layer on the substrate formed by electro-spark welding; and a solid lubricant layer applied on the lugs.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

As shown in FIG. 1 to FIG. 4, the wear resistant material is manufactured by forming the lugs (2) on the substrate (1)

of steel (SM45C) by electro-spark welding using a welding apparatus having a vibrator, and then by applying the solid lubricant layer (3) having lubrication on the lugs (2).

Figure 1:
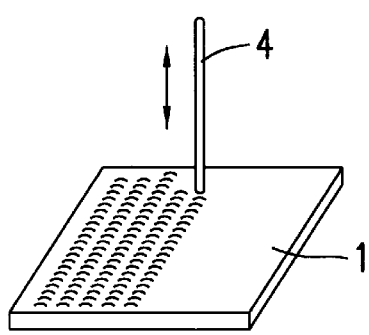
FIG. 1 is a drawing that describes a welding process forming lugs on substrate surface.
Figure 2:
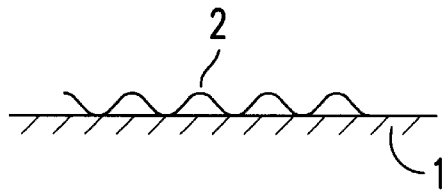
FIG. 2 is a cross-sectional drawing showing lugs formed by the present invention.
Figure 3:
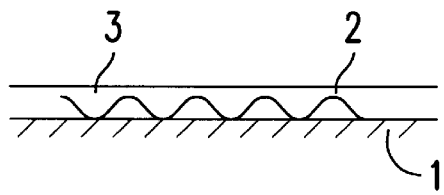
FIG. 3 is a cross-sectional drawing showing solid lubricant applied on lugs in accordance with the present invention.

The method of manufacturing the wear resistant material will be detailed below. First step is to clean the friction surface of the SM45C substrate (1) by steam or organic solvent such as alcohol and acetone, and dry it. Next step is to form the lugs (2) on the surface of the substrate by spark welding using a spendable electrode (4). During spark-welding, electrode (4) is rapidly moved with vibration (ref. FIG. 1). It is desirable to use wear resistant material such as copper alloy, molybdenum alloy, cobalt alloy, alloy of iron and other metals, as the material of the lugs. The lugs improve pressure resistance (load supporting capability) and wear resistance of the substrate.

Continuing with the method, the solid lubricant layer (3) is coated on the lugs (2). It is preferable to use $MoS_2$ or PTFE; or soft metal such as Pb, Sn, Zn and Bi, or alloys there of, as material of the solid lubricant layer (3). By this, layer deformation and shear flow on the substrate surface which is caused by the friction would be avoided and lubrication on the friction surface is maintained constantly.

Therefore, if the wear resistant material having multi-layers comprising the lugs (2) and the solid lubricant layer (3) is used in the bushing of a joint part, seizure resistance, wear resistance, lubrication and re-lubrication interval will be extremely improved.

Briefly, the wear resistant material having multi-layers, including which the solid lubricant applied on the lugs formed by electro-sparking, has excellent wear resistance, seizure resistance, pressure resistance and lubrication. It is because of this that the lugs provide load supporting capability based on the hardness of the welding material to wear resistant material, and the solid lubricant provides the ability to resist deformation and shear flow on the substrate surface caused by friction to maintain lubrication on the friction surface constantly.

The height, the width and the gab of the lugs formed by the electro-spark welding is adjustable in accordance with the operating condition of the joint part such as active load and sliding speed. In addition it is possible to use these wear resistant materials in the joint parts where it is hard to reapply the lubricant. Such as in heavy machinery, ship, aircraft and submarine, without checking for long periods.

Figure 5:
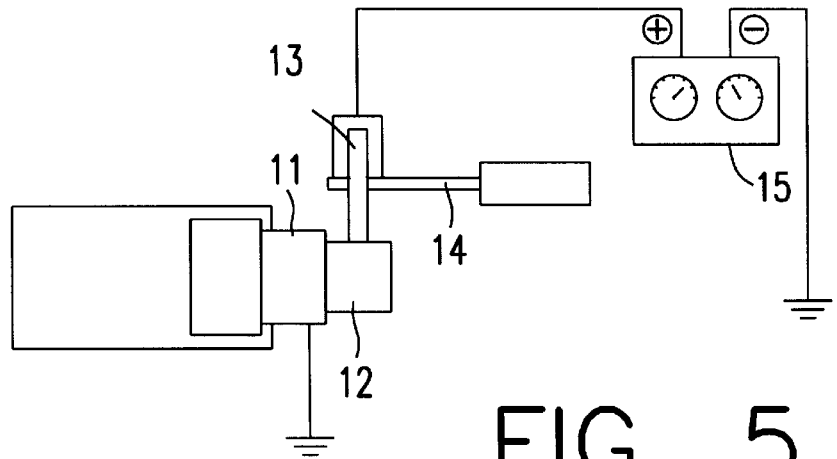
FIG. 5 is a simple diagram of a welding process.

Referring to FIG. 5, the electro-spark welding is carried out by using a welding apparatus (15) having a vibrator (14) and a electrode holder (13) after holding the work (12) to the chuck (11).

Figure 4:
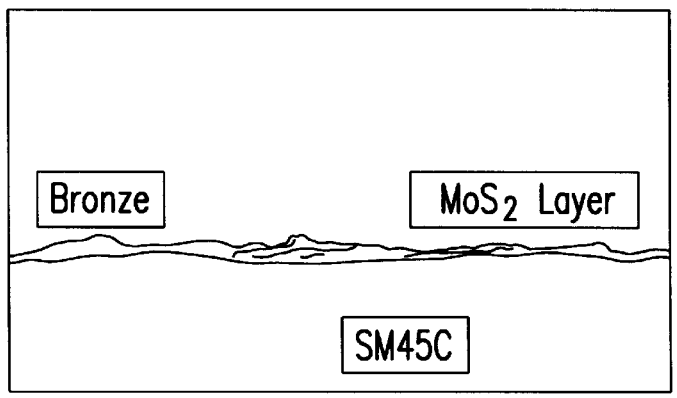
FIG. 4 is an optical microscope photograph (×100), showing surface layers of the present invention.

The material of the invention has the layers as illustrated in FIG. 4.

EXAMPLE

The inventor compared wear resistance of the disk of the invention and the disk having only MoS2 coating, and describe the results in Table 1.

Wear resistance test method:

Ring on Disc Friction Wear Test

Test condition:

load 800 kgf pressure 4 kgf/mm2 sliding speed 300 mm/sec dry condition

Specimen:

Ring-SM45C steel, induction hardening, surface hardness HRC 58-62

Disc-SM45C steel, quenching-tempering, hardness HRC20, surface welded by the invention Welding condition Electrode- alloy copper electrode (2.3% Mn, 0.0087% Cr, 0.16% Fe, 0.015% Al, 0.32% Ni, 0.0059% Si, the balance Cu)

Frequency of vibrator—120 Hz

Voltage—740 V

Power—88 watt

Welding rate: 3.2 cm2/min

The solid lubricant $MoS_2$ mingled with polymer resin is used. The ratio of the composition is known in the prior art.

TABLE 1

| Example No. | Seizure Transient Time(Sec) | Friction Coefficient $\mu$ | Wear Depth (mm) | Sliding Distance (m) | Welding Thickness ($\mu$m) | Solid Lubricant Layer Thickness |
|---|---|---|---|---|---|---|
| Comparative Example 1 | 8,600 | 0.04–0.05 | 0.054 | 258 | — | 45 |
| Comparative Example 2 | 15,450 | 0.04–0.06 | 0.062 | 464 | — | 47 |
| Example 1 | 504,500 | 0.07–0.09 | 0.033 | 15,35 | 14 | 46 |
| Example 2 | 454,500 | 0.06–0.09 | 0.052 | 13,635 | 13 | 37 |
| Example 3 | 276,050 | 0.08–0.10 | 0.036 | 8,382 | 19 | 37 |

In Table 1, while the comparative examples 1 and 2 are the materials applied with only the solid lubricant of the prior art, the examples 1, 2 and 3 are the materials of the invention welded on the surface by using vibrator and then applied with the solid lubricant.

As shown in Table 1, the materials of the prior art have much less seizure transient time than those of the invention. Conventionally it is known that the material of small friction coefficient has small wear. But it happens that the seizure comes first by the heat caused by friction and that the machine can't work anymore in spite of the small wear. To prevent it, the solid lubricant such as PTFE and MoS2 is applied, which makes it possible to minimize the seizure and the friction coefficient. Nevertheless, under high pressure the wear increases because of the deficiency of pressure resistance. The invention has more excellent seizure resistance and longer working life than the prior art.

As mentioned above, in the care of a joint part, the invention can extend the checking interval between reapplication of the lubricant, since it has lubrication that the material formed by the surface hardening method of the prior art doesn't have. Also the present invention achieves life extending effect for the joints, and solving the problems such as early part replacement or noise caused by friction wear, by providing increased seizure resistance and wear resistance.

Selecting the hard metals as the welding materials leads to excellent load supporting capability of the reformed surface, to formation of multi-layers available even under dry condition, to coating of the layer to the friction surface of the substrate, and to increasing of seizure resistance, wear resistance, pressure resistance and, in particular, reapplication interval for lubricants. Therefore, the wear resistant materials of the invention available under dry condition and can be used in the machines requiring high load, low speed, and high shear force in which the prior art materials couldn't work.

What is claimed is:

1. A method of manufacturing a wear resistant material having excellent wear resistance, comprising:
    providing lugs on a substrate surface by electrode-spark welding using a welding apparatus, and
    applying a solid lubricant layer having a wear resistance on said lugs.

2. The method of claim 1, wherein material of the lugs comprises at least one of copper alloys, molybdenum alloys, cobalt alloys, and alloys of iron.

3. The method of claim 1, wherein the solid lubricant is $MOS_2$ or polyfluoro ethylene.

4. The method of claim 1, wherein the solid lubricant is Pb, Sn, Bi, Zn, or alloys.

5. Wear resistant material having excellent wear resistance, comprising a substrate; lugs on the substrate formed by electro-spark welding; and a solid lubricant layer applied on the lugs.

* * * * *